United States Patent
Hayashi

(10) Patent No.: US 7,710,750 B2
(45) Date of Patent: May 4, 2010

(54) INVERTER WITH TIME COUNTING FUNCTION

(75) Inventor: Hiroaki Hayashi, Hyogo (JP)

(73) Assignee: Fuji Electric Systems Co., Ltd. (JP)

( * ) Notice: Subject to any disclaimer, the term of this patent is extended or adjusted under 35 U.S.C. 154(b) by 196 days.

(21) Appl. No.: 11/677,831

(22) Filed: Feb. 22, 2007

(65) Prior Publication Data
US 2007/0201172 A1    Aug. 30, 2007

(30) Foreign Application Priority Data
Feb. 24, 2006   (JP)   ............................. 2006-049319

(51) Int. Cl.
*H02H 7/122* (2006.01)
*H02H 3/20* (2006.01)
*G06M 1/10* (2006.01)

(52) U.S. Cl. .................. 363/56.05; 361/90; 324/76.48; 324/76.62

(58) Field of Classification Search .............. 363/56.03, 363/56.05, 56.07, 56.08, 56.1, 56.11; 361/18, 361/90, 91, 93, 88; 713/400, 401, 501, 502; 375/357; 324/522, 76.47, 76.48, 76.61, 76.62
See application file for complete search history.

(56) References Cited

U.S. PATENT DOCUMENTS

| | | | | |
|---|---|---|---|---|
| 4,615,000 A | * | 9/1986 | Fujii et al. | 363/41 |
| 5,005,190 A | * | 4/1991 | Itoi | 375/357 |
| 5,550,697 A | * | 8/1996 | Green et al. | 361/18 |
| 5,877,816 A | * | 3/1999 | Kim | 348/526 |
| 5,945,788 A | * | 8/1999 | Li et al. | 315/308 |
| 6,005,757 A | * | 12/1999 | Shvach et al. | 361/64 |
| 6,229,765 B1 | * | 5/2001 | Rabi | 368/156 |
| 6,469,575 B1 | * | 10/2002 | Oki et al. | 330/10 |
| 6,570,779 B2 | * | 5/2003 | Shimazaki et al. | 363/41 |
| 6,948,103 B2 | * | 9/2005 | Indo | 714/51 |
| 7,133,300 B1 | * | 11/2006 | Yang | 363/56.11 |

FOREIGN PATENT DOCUMENTS

JP    06-014558 A    1/1994

* cited by examiner

*Primary Examiner*—Jessica Han
*Assistant Examiner*—Emily Pham
(74) *Attorney, Agent, or Firm*—Rossi, Kimms & McDowell LLP

(57) ABSTRACT

The inverter according to the invention includes a control microcomputer including a protector circuit that stops the inverter when an anomaly is caused, a counter that counts the driving clock signals of the microcomputer from the instance at which the protector circuit starts working, and a conversion circuit that converts the clock signals counted by the counter to a numerical time expression in the time units and outputs the converted numerical time expression. The inverter according to the invention, manufacturable with low manufacturing costs and easy to operate, facilitates informing the installation manager of the period of time from the instance at which the inverter stopped due to an anomaly and such a cause, without impairing the time measurement precision.

6 Claims, 2 Drawing Sheets

INVERTER WITH TIME COUNTING FUNCTION

FIELD OF THE INVENTION

The present invention relates to an inverter that drives the load of various installations. Specifically, the present invention relates an inverter that exhibits a function of measuring the stop period thereof when the inverter stops operating by the protecting function thereof.

BACKGROUND OF THE INVENTION

In many installations, inverters are used to drive the motor and the load of the installations. The inverters are provided with a protector circuit that functions, while the inverters are working, for protection against anomalies such as overcurrent protection, overload protection, over-voltage protection, and under-voltage protection to make the installations stop operating when any anomaly is detected. For managing the working situations of the installations, it is necessary for the installation manager to know the stop time of the inverter and the installations.

For monitoring the time of the stop due to the operation of the protector circuit in the inverter, the clock function of a programmable controller ranking high in the installation management control apparatuses is used generally. Although the stop time monitoring using the programmable controller ranking high does not pose any problem on the accuracy thereof, the monitoring costs soars and it is not possible to display the stop time on the display device of the inverter.

Unexamined Laid Open Japanese Patent Application Hei. 6 (1994)-14558 discloses an inverter that facilitates closely examining the causes of anomalies. While the inverter is working, data such as the driving status, the output frequency, the output current, and output voltage of the inverter are written in at a certain time interval. The disclosed inverter is provided with a memory that stores the above described data for a predetermined period of time from the past to the present and the data writing into the memory is stopped at the instance an anomaly is detected. After an anomaly is caused, the stored contents of the memory is displayed on a display device disposed outside the inverter or a display device on the inverter so that the process, through which the anomaly is caused, and the cause of the anomaly may be examined closely. However, the costs of the inverter increases, since it is necessary for the inverter to equip the memory for storing a lot of data relevant to the anomaly caused and a processor that controls the data storage. For simply obtaining the period from the time at which the inverter stopped, the operations conducted by the disclosed inverter for obtaining the necessary data may be complicated too much to obtain the necessary data.

The inverter is controlled with a microcomputer driven by a quartz oscillator and such a clock and capable of measuring the time internally. In utilizing the clock in the microcomputer, an inexpensive oscillator is used generally. In other words, a less precise clock is employed generally. Therefore, a larger error is caused as compared with the quartz clock as the counted time is longer. Since a battery is generally not disposed in the inverter, it will be necessary, once the power supply is interrupted, to reset the time, even if an expensive and precise oscillator is employed, causing a heavy burden on the user, who is the manager of the installations.

In view of the foregoing, it would be desirable to provide an inverter that facilitates informing the installation manager of the period of time from the instance, thereat the inverter is stopped due to an anomaly and such a cause. It would be also desirable to provide an inverter, which the user such as an installation manager can operate easily, with low manufacturing costs. It would be further desirable to provide an inverter that facilitates measuring a period of time with reasonable precision.

SUMMARY OF THE INVENTION

For obviating the problems described above, the inverter according to the invention utilizes the oscillator circuit in the inverter and counts the time from the instance at which the protector circuit starts operating due to an anomaly caused. When the installation manager finds, during a patrol and such a routine, that the inverter is conducting the protecting operation thereof, the configuration according to the invention makes it possible for the installation manager to determine the time at which the protector circuit started exhibiting the protecting function thereof, by subtracting the counted time from the present time known easily by the other means.

According to an aspect of the invention, there is provided an inverter including: a microcomputer controlling the inverter, the microcomputer including a protector circuit, the protector circuit stopping the operation of the inverter when an anomaly is caused; a counter counting the driving clock signals of the microcomputer from the instance at which the protector circuit starts operating; and a conversion circuit outputting the number of the clock signals counted by the counter. According to the invention, a relatively inexpensive but not-so-precise oscillator circuit such as an oscillator circuit in the inverter is used to count the time from the instance, at which the protector circuit starts operating. Although a certain time counting error may be caused due to the not-so-precise oscillator circuit used according to the invention, the time counting error may be suppressed to be a relatively small error, since a not-so-long period of time after the start of the protector circuit is counted according to the invention. Since the inverter according to the invention facilitates identifying the stop period of the installations by a relatively inexpensive but relatively precise method, the inverter according to the invention makes it possible for the installation manager to estimate the influences of the installation interruption and to plan the countermeasures for recovery.

The inverter according to the invention counts the clock signals from a not-so-precise oscillator in the inverter from the instance at which the protector circuit starts operating, converts the counted number of the clock signals to a numerical time expression, and displays the numerical time expression in the time units. The inverter according to the invention facilitates determining the time at which the protector circuit started operating and the inverter stopped, relatively precisely by a relatively inexpensive method. When the installation manager finds, during a patrol and such a routine, that the inverter is conducting the protecting operation thereof, the inverter according to the invention make it possible for the installation manager to estimate easily and relatively precisely the time, at which the protector circuit started exhibiting the protecting function thereof, by subtracting the counted time from the present time known easily by the other means such as the wrist watch thereof.

DESCRIPTION OF SPECIFIC EMBODIMENTS

Figure 1:
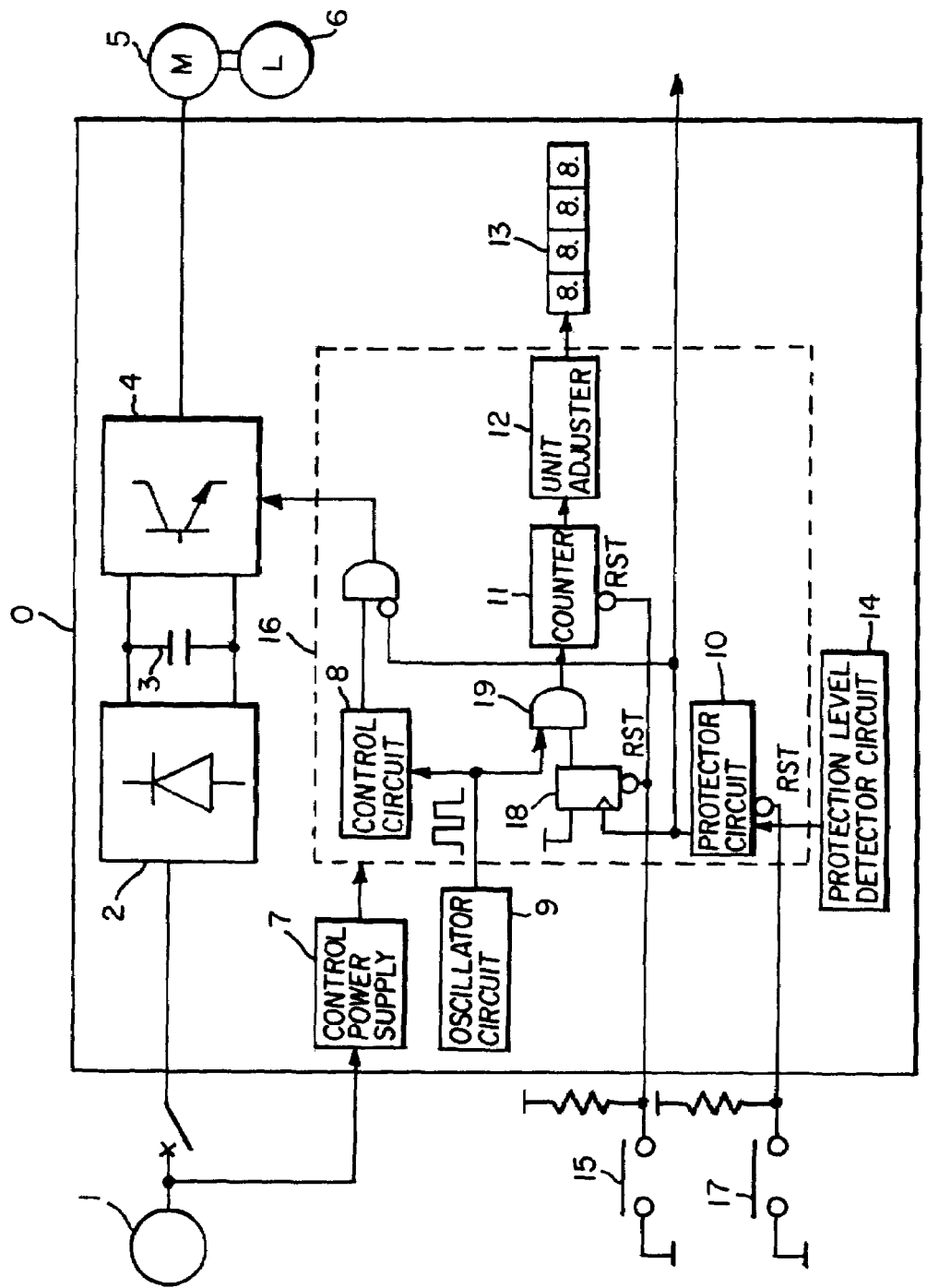
FIG. 1 is a block diagram describing the configuration of an inverter according to a first embodiment of the invention.

Now the invention will be described in detail hereinafter with reference to the accompanied drawings which illustrate the specific embodiments of the invention. FIG. 1 is a block diagram describing the configuration of an inverter according to a first embodiment of the invention. In FIG. 1, inverter 0, commercial AC input power supply (hereinafter referred to as "main power supply") 1, motor 5, and load 6 are shown. Inverter 0 includes a forward converter circuit 2 that rectifies the AC fed from AC input power supply 1 to convert the AC signal to a DC signal, a capacitor 3 that smoothes the rectified output from forward converter circuit 2, and inverter circuit 4 that converts the DC to an AC modulated by PWM and having an arbitrary frequency and an arbitrary voltage within the respective predetermined ranges. Motor 5 drives load 6.

A control power supply different from main power supply 1 is connected to control power supply circuit 7. A signal for switching on and off the semiconductor devices in inverter circuit 4 is generated by microcomputer 16 that obtains the power supply thereof from control power supply circuit 7. Microcomputer 16 is working based on the signal from external oscillator circuit 9. Microcomputer 16 includes control circuit 8 that generates the signal for switching on and off the semiconductor devices in inverter circuit 4 and protector circuit 10 that stops the operation of inverter 0 when protector circuit 10 receives an anomaly signal from protection level detector circuit 14 disposed for anomaly detection. Even if protector circuit 10 operates due to an anomaly caused, the power supply to control power supply 7 is maintained.

If an anomaly such as an overcurrent, overload, over-voltage, under-voltage, and overheat is caused while the inverter is working, protection level detector circuit 14 detects the anomaly and sends an anomaly detection signal to protector circuit 10. Then, protector circuit 10 starts working and the switching signal sent from control circuit 8 to inverter circuit 4 is stopped. As the switching signal is stopped, inverter circuit 4 stops operating. In other words, the operation of inverter 0 is interrupted.

At the same time when protector circuit 10 starts working, a rising signal is inputted to latch circuit 18 based on the output from protector circuit 10. Therefore, the clock signals from oscillator circuit 9 are outputted through AND gate 19 and counter 11 starts counting the clock signals from oscillator circuit 9. Although the clock signals are counted directly according to the first embodiment of the invention, the clock signals via a frequency divider circuit may be counted with no problem. The counted value is converted by conversion circuit 12 to a numerical expression in the general time units of second, minute, hour, day, and year. The converted time data is outputted to display device 13 of the inverter and displayed thereon.

Since counter 11 keeps counting after the protecting operation is canceled by protecting operation reset circuit 17 by virtue of the provision of latch circuit 18, the time that has elapsed is displayed on display device 13 so that the time that has elapsed may be identified. As the installation manager identifies the displayed data and presses the switch of external reset circuit 15, counter 11 is reset.

Figure 2:
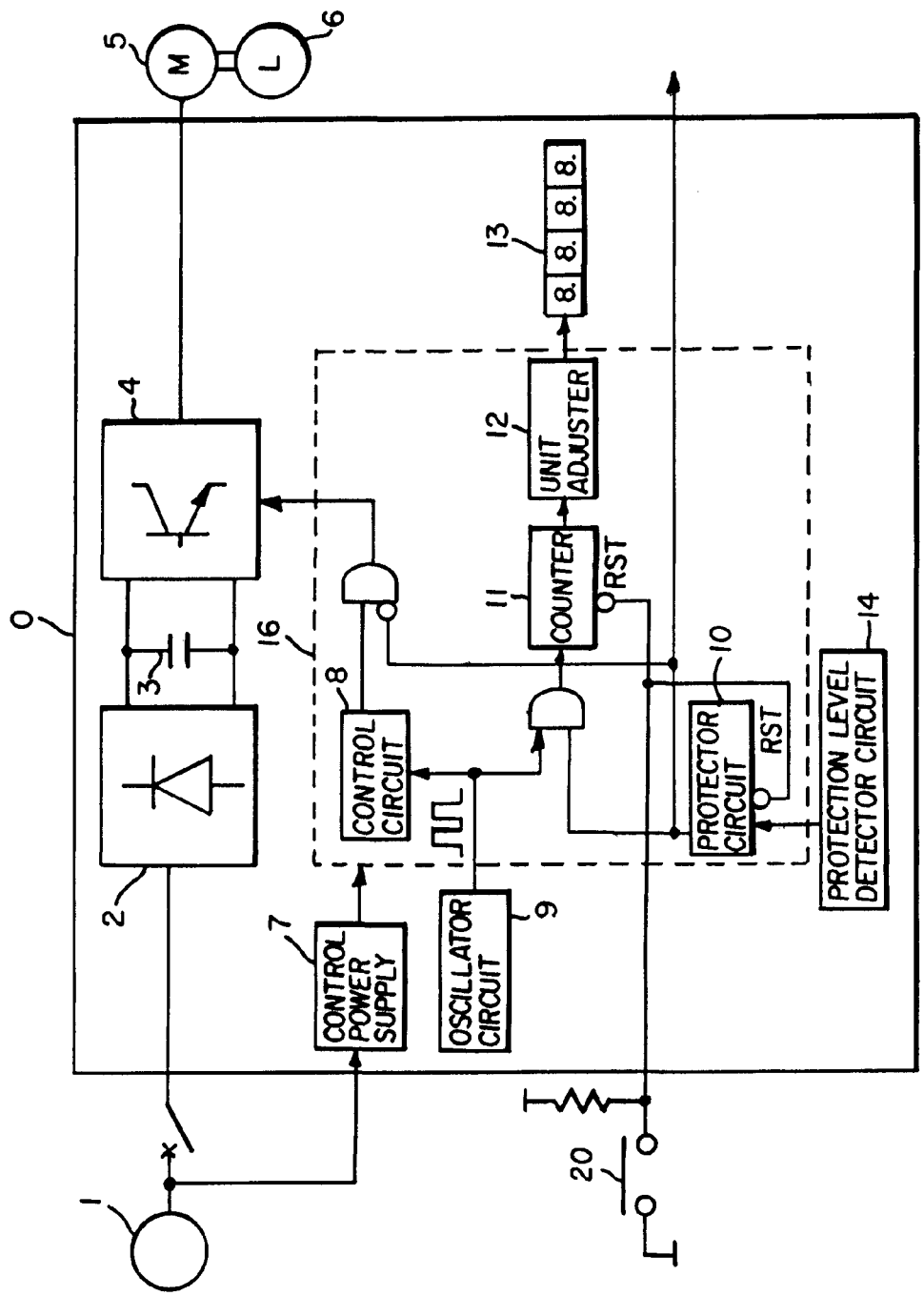
FIG. 2 is a block diagram describing the configuration of an inverter according to a second embodiment of the invention.

FIG. 2 is a block diagram describing the configuration of an inverter according to a second embodiment of the invention. Since the inverter shown in FIG. 2 has almost the same configuration with the configuration of the inverter according to the first embodiment, the descriptions on the same constituent elements are omitted for the sake of simplicity. The circuit shown in FIG. 2 has a simplified configuration including reset circuit 20 that works for the reset circuit for resetting the protection state in FIG. 1 and for the reset circuit for resetting the counter in FIG. 1 but excluding the latch circuit. The circuit shown in FIG. 2 conducts time counting only while the protecting operation is continuing.

In detail, the circuit shown in FIG. 2 works in a different manner from the circuit shown in FIG. 1 as described below.

In the circuit shown in FIG. 1, as protector circuit 10 works due to an anomaly such as overheat and the operation of the inverter is interrupted, counter 11 starts time counting. As the inverter temperature lowers with elapse of time and the installation manager presses the switch of reset circuit 17, protector circuit 10 shifts from the operating state thereof to the released state thereof. However, the time counting operation of the counter is continuing. As the installation manager presses the switch of reset circuit 15 after identifying the stop time of the inverter displayed on display device 13, counter 11 is reset.

In the circuit shown in FIG. 2, as protector circuit 10 works due to an anomaly such as overheat and the operation of the inverter is interrupted, counter 11 starts time counting and the installation manager identifies the counted stop time of the inverter displayed on display device 13. As the inverter temperature lowers with elapse of time and the installation manager presses the switch of reset circuit 20 for canceling the protection state, the protection state by protector circuit 10 is canceled and counter 11 is reset simultaneously. In short, the circuit shown in FIG. 1 cancels protection state by protector circuit 10 and resets counter 11 separately. The circuit shown in FIG. 2 cancels the protection state of the circuit and resets the counter simultaneously.

Although the invention has been described so far in connection with the inverter, the invention is applicable to other installations. For example, although display device 13 in FIGS. 1 and 2 has numeral LEDs that display the measured time in a digital quantity, the counted time may be displayed alternatively in an analog quantity with no problem. Still alternatively, the measured time may be transmitted by a wireless communication, wired communication, and such a communication means to a display device disposed outside the inverter and displayed thereon with no problem. Thus, changes and modifications are obvious to those skilled in the art without departing from the spirit and scope of the invention.

As described above, the ordinary clock, which always counts the time while the inverter is operating normally, is not used according to the invention but a relatively inexpensive and less precise clock such as an oscillator circuit in the inverter is used to count the time from the instance, thereat the protector circuit starts operating. Although a certain time counting error may be caused due to the not-so-precise clock used according to the invention, the time counting error may be suppressed to be small, since a not-so-long period of time after the start of the protector circuit is counted according to the invention. Since the inverter according to the invention facilitates identifying the stop period of the installations by a relatively inexpensive but relatively precise method, the inverter according to the invention makes it possible for the installation manager to estimate the influences of the installation interruption and to plan the countermeasures for recovery.

What is claimed is:

1. An inverter comprising:
   a microcomputer including a protector circuit, wherein the protector circuit stops the operation of the inverter when an anomaly is detected;
   an oscillator circuit that generates driving clock signals that are supplied to the microcomputer;

a counter that counts the driving clock signals in response to the protector circuit stopping the operation of the inverter; and a conversion circuit that outputs the number of the clock signals counted by the counter as converted time data corresponding to a numerical time expression.

2. The inverter according to claim 1, wherein the numerical time expression includes one or more time units of second, minute, hour, day, and year.

3. The inverter according to claim 1 or 2, further comprising a display device that displays the converted time data outputted from the conversion circuit.

4. The inverter according to claim 3, wherein the display device displays the data in a digital quantity or an analog quantity.

5. The inverter according to claim 1, further comprising:

a protecting operation reset circuit that resets the operation of the protector circuit;

a latch circuit that latches the operation of the counter to continue operation even after activation of the protecting operation reset circuit to reset the operation of the protector circuit; and a counter reset circuit that resets the operation of the counter.

6. The inverter according to claim 1, further comprising:

a reset circuit that simultaneously resets the operation of the protector circuit and the counter.

\* \* \* \* \*